June 24, 1952  G. VALENSI  2,601,346

POLARIZATION CORRECTOR

Filed Sept. 17, 1945

(a)   (b)

INVENTOR.
GEORGES VALENSI
BY
ATTORNEY

Patented June 24, 1952

2,601,346

UNITED STATES PATENT OFFICE 2,601,346

POLARIZATION CORRECTOR

Georges Valensi, Paris, France

Application September 17, 1945, Serial No. 616,829
In France September 16, 1944

6 Claims. (Cl. 343—100)

The invention relates to a device which restores in its normal initial state of polarization an electromagnetic wave carrying the telecommunication signals, after reflection from obstacle which has modified said initial state of polarization.

Figure 1:
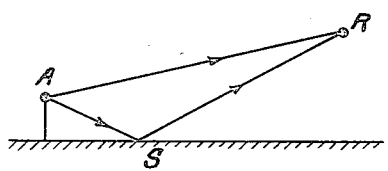
Figures 1 and 4 are diagrams showing the polarization corrector used in conventional radio systems.

It is well known that, in the case of a radioelectric transmission of ultra-short waves between an emitting antenna A, located at short distance above the ground S and a receiving set R in direct visibility for antenna A, a parasitic wave ASR is produced by reflection from ground S, and the state of polarization of said parasitic wave is different from the state of polarization of the direct wave AR (Figure 1).

At ultra-high frequencies, the displacement current in the ground predominates the conduction current, because the ground behaves like a dielectric medium or refractive index different from that of the air, so that the laws of vitreous reflection apply; if the plane of polarization which is perpendicular to incident electric field vector of amplitude $a$ makes an angle equal to $\theta$ with the plane of incidence which changes the incident ray and the normal to the surface of separation of both media, the incident wave may be divided into one wave $a1 = a \cos \theta$ polarized in the plane of incidence and another wave $a2 = a \sin \theta$, polarized perpendicularly to the plane of incidence. Fresnel formulae give the two corresponding components of the reflected waves:

$$a_1'' = -a \frac{\sin(i-r)}{\sin(i+r)} \cos \theta$$

$$a_2'' = -a \frac{\tan(i-r)}{\tan(i+r)} \sin \theta$$

$r$ being the refraction angle, $i$ the incidence angle.

If $n$ is the refractive index of the first medium (air) and $\epsilon$ its dielectric constant, if $n°$ and $\epsilon'$ are the corresponding constants for the ground for the frequencies in consideration, and if the magnetic permeabilities $u$ and $u'$ of the two media are supposed equal to unity, the following approximate equations are satisfied:

$$n \sim \sqrt{\epsilon} \qquad n° \sim \sqrt{\epsilon'}$$

and also the equation:

$$n \sin i = n° \sin r$$

is satisfied.

Except in the case of the brewsterian incidence $$\beta = \arctan\left(\frac{n°}{n}\right)$$

the reflected wave is rectilinearly polarized, and its plane of polarization makes with the plane of incidence an ange $\theta°$ such that:

$$\tan \theta° = \frac{a_1''}{a_2''} \frac{\cos(i-r)}{\cos(i+r)} \tan \theta$$

The rotation of the plane of polarization is $(\theta' - \theta)$. For the brewsterian incidence, a very flat elliptic vibration is obtained, instead of a rectilinearly polarized vibration.

In the case of normal incidence $(i=o)$, when the reflection goes from one less refractive medium to a more refractive medium $(i=r)$, the reflection introduces a phase shift equal to $\pi$: the sign of the electric field changes, but the sign of the magnetic field does not change. For the brewsterian incidence, the electric field vector is suppressed by the reflection when it is contained in the plane of incidence, that is when $(i+r) = 90$ degrees, $$\tan i = \frac{n°}{n}$$

$\sin r = \cos i$, the second medium being more refractive than the first. If the second medium is less refractive than the first $(n° > n)$, a total reflection is produced for the limiting angle $$i = \arcsin \frac{n°}{n}$$

this limiting angle $l$ is greater than the angle $$\beta = \arctan \frac{n°}{n}$$

corresponding to the brewsterian incidence.

After having so recalled the laws of the vitreous reflection, Fig. 1 shows that the reflected wave ASR can, in the most unfavorable case, reach the receiving antenna at R with an increase of phase of $\pi$, by comparison with the phase which would correspond to the length of path ASR; if antenna A is close to ground and if antenna R is not at a very great altitude, the direct wave AR and the reflected wave ASR tend to cancel each other. In any case, the reflected wave ASR has at R, a state of polarization which is different from the one of the direct wave AR.

In the case of metallic reflection, that is when a wave propagated in a dielectric l, impinges a plane surface separating said dielectric from an adjacent uniform conducting medium A, the above results are still valid, if the dielectric constant $\epsilon^1 = n'^2$ is replaced by $$\epsilon_2 = j\frac{4\pi\gamma}{\omega}$$

where $\epsilon_2$ is the dielectric constant of conducting medium 2, $\gamma$ its electric conductivity and $\omega = 2\pi f$ the pulsation, $f$ being the frequency, with $$j = \sqrt{-1}$$

Another useful example to be considered is the case of the propagation of a type $H_1$ electromagnetic wave, rectilinearly polarized wave, in a wave guide, hollow metallic tube or plain dielectric tube, having an "elbow" or curvature, which, for simplification, will be compared with a cant. The reflection on said cant, elbow of the waveguide, can also produce a rotation of the plane of polarization of incident wave $H_1$. This may be particularly troublesome in the systems of multiple transmission by means of differently polarized electromagnetic waves, when the signals transmitted over the various channels of the system are discriminated from each other at the receiving station, in accordance with their different states of polarization; for example in accordance with the azimuth of the electric vectors of the various type—$H^1$ electromagnetic waves simultaneously utilized for the various channels, as mentioned in the French Patent No. 905,230, dated January 29, 1942, and entitled "System of Multiple Transmission With Differently Polarized Electromagnetic Waves."

In order to compensate for the accidental changes of the state of polarization, use is made, according to my invention, of a "corrector of polarization" which is an "active artificial body," that is to say a structure having rotatory polarization. Such an "active" structure is, by definition, non superposable with its image in a mirror, an asymmetry of this kind being that of the curve called "helix" or of the dissymmetric tetrahedrons of the chemists or in the right hand as compared to the left hand. Any active structure can exist under two forms called "enantiomorphous" which are respectively the image of each other in a mirror, but which cannot be superposed on each other, they are "optical inverses" and are respectively called "right" and "left" or dextrorotary and levorotary.

Various types of such structures may be utilized:

1°: Similar to the "active liquids" the rotatory power of which are bound with the molecular structure, use may be made of a structure constituted by juxtaposed "bodies" each body being constituted by elements having an asymmetrical arrangement inside the body. For example, said elements may be little granules, spheres, cubes, etc., of different dielectric or conducting materials ($S_1$, $S_2$, $S_3$, $S_4$) said granules may be, for example, located at the vertex or angles of tetrahedrons taken alone or in association two by two.

Figure 2:
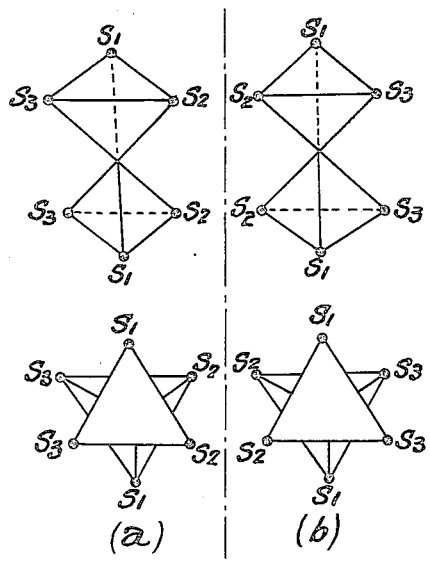

Each body may be constituted in coupling two tetrahedrons, if the so obtained structure has no center and no mirror. For example, Fig. 2 shows 2 enantiomorphous structures comprising elements of different materials $S_1$, $S_2$, $S_3$, the "right" structure being represented on part (a) and the "left" structure on part (b) of the figure.

Figure 3:
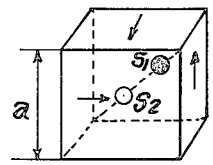
Figures 2 and 3 are diagrams to explain the structure of the polarization corrector.

2°: Similar to certain "active crystals" such as quartz or sodium chlorate, use may be made of a structure, the rotatory power of which is due to an asymmetric arrangement of symmetrical bodies. The bodies may be located along a helix (right or left) around a ternary axis, as in a natural crystal of quartz. The atoms $S_1$, $S_2$ in each elementary part of the structure, represented on Fig. 3 by a cube may be located on a diagonal like in a natural crystal of sodium chlorate, each atom ($S_1$ or $S_2$) being of a symmetrical form, said forms being different for $S_1$ and for $S_2$ and the materials of $S_1$ and $S_2$ being different. If each of these elementary cubes is rotated around the helicoidal axis represented by plain black arrows 180 degrees, each rotation being followed by a translation of amplitude $a$, an artificial "crystal" is obtained in the cubic crystallographic system, without any plane or center of symmetry, and again two enantiomorphous structures are so possible.

3°: Similar to magnesium sulphate ($M_g$ $SO_4$, 7 $H_2O$) of the orthorhombic crystallographic system, use may be made of a structure constituted by an arrangement of artificial biaxial hemihedral crystals having symmetrical bodies, the rotatory power of which is due to the hemihedral characteristic, that is to say to the presence of certain modifications, such as a cant, only on half of the corresponding edges or angles of the various crystals.

4°: Use may be made of a structure, the rotatory power of which is due partly to the molecular structure, and partly to the hemihedral characteristic, similarly to uniaxial rubidium tartrate, or to biaxial tartric acid.

5°: It is also well known that the rotatory power is obtained by combining bi-refringent plates such as thin mica sheets, in such a way that the principal sections of said plates are disposed along a spiral. For example, use may be made of four groups of three rectangular plates having each a thickness corresponding to a quarter wave length, each plate making an angle of 60° with the next one. It is known also that a foil of rubber under stress or a foil of annealed cellophane or gelatine is bi-refringent. In the case of rubber, for example, an increase of length of four times the initial length produces a difference ($n_o - n_e$) between the ordinary and extraordinary refractive indices of the order of 0.017; in case of cellophane the process of manufacture (lamination) produces a value ($n_o - n_e$) of the order of 0.011. An artificial active body may thus be obtained in disposing 12 of said plates in such a manner that their principal sections are disposed in spiral.

When a rectilinearly polarized electro-magnetic wave goes through a certain thickness $l$ of an artificial active body according to my invention, the plane of polarization rotates proportionally to said thickness $l$, said rotation varying with the wave length of frequency of said wave, and also possibly with the temperature. This rotation of the plane of polarization may be clockwise or reverse depending on the relative position of the elements or bodies constituting said active artificial body.

If the rotatory power of said body is due to the asymmetry of the body itself, the direction along which the electro-magnetic wave travels does not matter; if the rotatory power is due to an asymmetric arrangement of symmetrical bodies, the wave should travel along one of a few preferred axes of the artificial active body.

Figure 4:
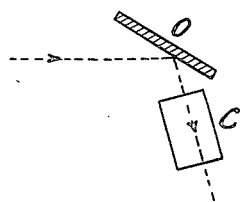

Consequently, if, as shown in Figure 4, an electro-magnetic wave meeting an obstacle O, is effected by a change of state of polarization, an active artificial body C, located after the obstacle O, and having an appropriate structure and a convenient thickness will compensate exactly the detrimental effect previously produced by obstacle O and will restore the state of polarization which existed before the action of O.

The artificial active body C, Figure 4 may be an homogeneous structure of one of the five types hereabove mentioned or may be a combination of several structures of different types: such a combination is similar to a mixture of natural active bodies to which Biot's law of addition applies.

In order to avoid the production, by the artificial active body, of an excessive attenuation of the transmitted electromagnetic wave, it is better to use in such an active body for holding the elements or elementary granules, dielectric materials having very small dielectric losses at high frequencies, such as trolitum or polystyrene, paraffin, fused quartz, steatite or porcelain of the type "magnesium silicate," or synthetic resins containing vinyl chloride or vinyl acetate, or special Bakelite, etc.

For manufacturing the desired structures by means of such elements use may be made of a mechanical process, stamping, drilling, weaving, etc., or of a photo-chemical process, photography, photoengraving, etc., or of an electromagnetic process, etc. These processes are well known and several ones have been described in detail in the French Patent No. 905,230, of January 29, 1942, entitled "System of Multiple Transmission With Differently Polarized Electromagnetic Waves."

Having now described my invention, what I claim as new and desire to secure by Letters Patent is:

1. A corrector of polarization for use in telecommunication systems in which signals are transmitted by electromagnetic waves and at least a portion of these waves are reflected, thereby causing a shift in polarization of the reflected wave with respect to that of the non-reflected wave, comprising a plurality of artificial molecules, each molecule being small compared with the wave length of said electromagnetic waves and including granules of dielectric materials of different physical characteristics located with respect to one another so that the artificial molecule is asymmetrical, said granules being located at the vertex or angles of tetrahedrons and connected together by thin strings of a dielectric material of very low dielectric losses at high frequencies, said artificial molecules being placed at random within a holder of dielectric material of very low dielectric losses at high frequencies, whereby the structure formed by said artificial molecules, for the electromagnetic waves transmitted through it in any direction, acts like an active liquid, the rotatory power of which is bound with the asymmetric structure of the molecule.

2. A corrector of polarization for use in telecommunication systems in which signals are transmitted by electromagnetic waves and at least a portion of these waves are reflected thereby causing a shift in polarization of the reflected wave with respect to that of the non-reflected wave, comprising a plurality of artificial molecules, each molecule being small with respect to the wavelength of said electromagnetic waves and being constituted by granules of dielectric materials connected together by thin supports of a dielectric material of very low dielectric losses at high frequency, the structure formed by said artificial molecules having an appropriate thickness and being located in the path of said reflected wave, said granules within said structure providing an asymmetrical pattern, said structure producing a rotation of the plane of polarization of said reflected wave for compensating the shift of polarization due to the reflection, so that the reflected wave has the same polarization as the non-reflected wave when both waves reach the signal receiver.

3. A corrector of polarization in accordance with claim 2, in which the arrangement of the granules within each artificial molecule is asymmetrical, said artificial molecules building together a structure the rotatory power of which is bound with the asymmetry of the artificial molecule.

4. A corrector of polarization in accordance with claim 3, in which the granules constituting an artificial molecule have different physical characteristics and are located at the vertex of tetrahedrons.

5. A corrector of polarization in accordance with claim 2, in which the arrangement of the granules within each artificial molecule is asymmetrical, the various rows of said artificial molecules building together an asymmetrical structure, the rotatory power of which is bound with the asymmetry of the arrangement of said symmetrical artificial molecules.

6. A corrector of polarization in accordance with claim 5, in which the granules within each artificial molecule are arranged along a small portion of a helix, said helixes having all the same twist and their axes being substantially parallel, whereby the structure formed by the various rows of said artificial molecules has a rotatory power for electromagnetic waves transmitted parallel to the privileged direction of said axes and has no substantial rotatory power in other directions.

GEORGES VALENSI.

REFERENCES CITED

The following references are of record in the file of this patent:

UNITED STATES PATENTS

| Number | Name | Date |
| --- | --- | --- |
| 2,075,094 | Chubb | Mar. 30, 1937 |
| 2,130,389 | Gothe | Sept. 20, 1938 |
| 2,153,209 | Scharlau | Apr. 4, 1939 |
| 2,257,284 | Stokes | Sept. 30, 1941 |
| 2,407,318 | Mieher et al. | Sept. 10, 1946 |

FOREIGN PATENTS

| Number | Country | Date |
| --- | --- | --- |
| 132,858 | Great Britain | Sept. 23, 1919 |
| 909,047 | France | Nov. 19, 1945 |
| 668,231 | Germany | Nov. 28, 1938 |

OTHER REFERENCES

Organic Chemistry by Gilman, Vol. I, see section pertaining to enantiomorphes.